United States Patent

[11] 3,556,539

| | | |
|---|---|---|
| [72] | Inventor | Dino Senigalliesi<br>Turin, Italy |
| [21] | Appl. No. | 757,516 |
| [22] | Filed | Aug. 15, 1968<br>Continuation of application Ser. No.<br>461,093, June 3, 1965, now abandoned. |
| [45] | Patented | Jan. 19, 1971 |
| [73] | Assignee | RIV Officine di Villar Perosa Societa per Azioni<br>Turin, Italy |
| [32] | Priority | June 16, 1964 |
| [33] | | Italy |
| [31] | | 13418/64 |

[54] SEALING MEANS FOR BALL OR ROLLER BEARINGS
2 Claims, 17 Drawing Figs.

[52] U.S. Cl. .................................................... 277/94,
277/209, 308/36.2
[51] Int. Cl. ...................................................... F16j 15/34
[50] Field of Search ............................................ 277/94, 95,
207—211; 308/36.2, 187.1, 187.2

[56] References Cited
UNITED STATES PATENTS
3,113,814  12/1963  Kanji Ogura ................ 308/187.2
FOREIGN PATENTS
783,031  9/1957  Great Britain ................ 277/94
852,993  11/1960  Great Britain ................ 277/94

Primary Examiner—Laverne D. Geiger
Assistant Examiner—Jeffrey S. Mednick
Attorney—Sughrue, Rothwell, Mion, Zinn and MacPeak ABSTRACT: A seal for antifriction bearings in the form of an annular washer includes; an outer edge, shaped to be deformed upon insertion into a race groove, a stiff intermediate section, and a tapered inner portion for cooperation with the other bearing race. The seal is formed of homogenous resilient material. The seal includes one or more axially extending annular projections between the outer edge and intermediate section which reinforces the connecting zone between the outer edge and intermediate section.

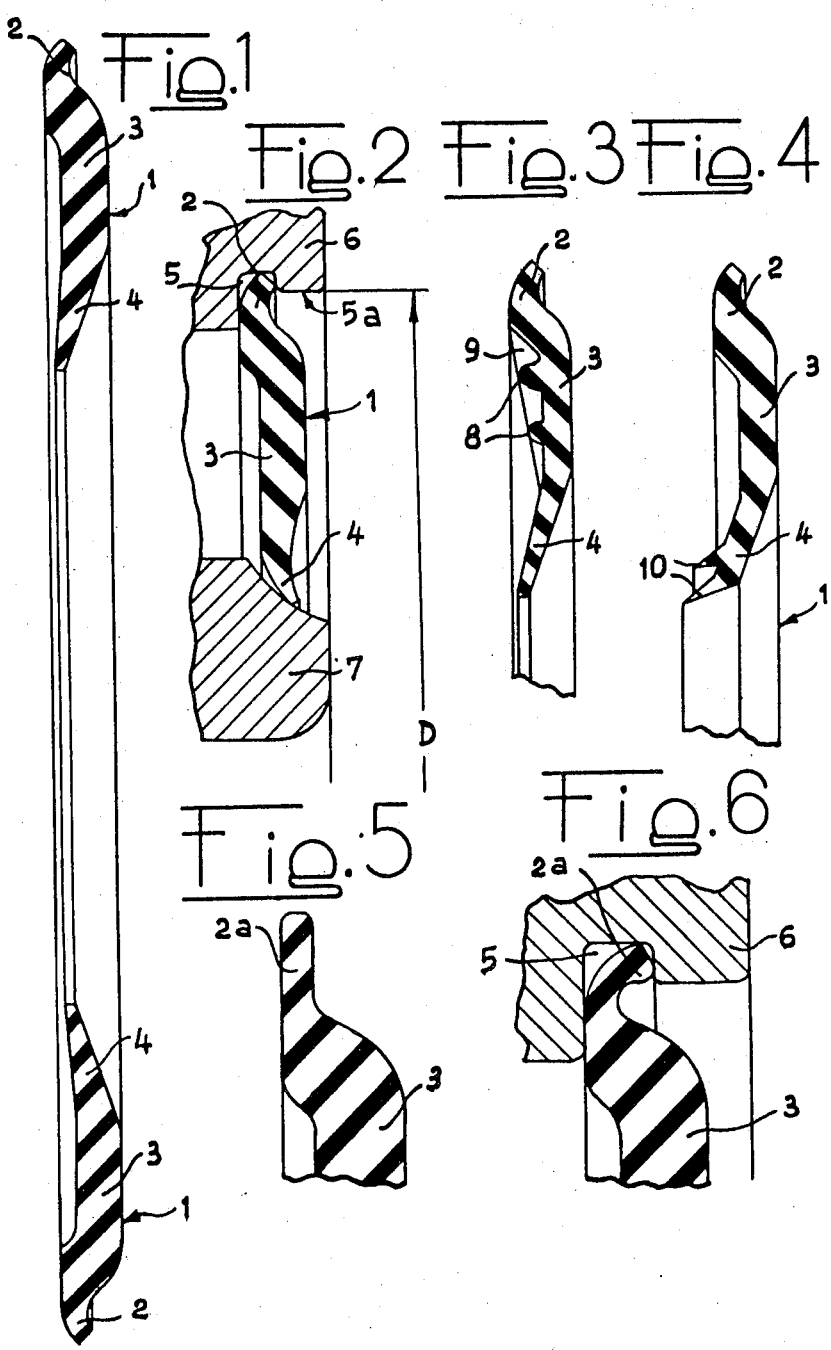

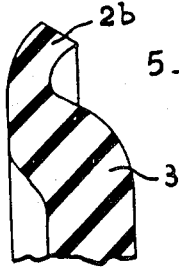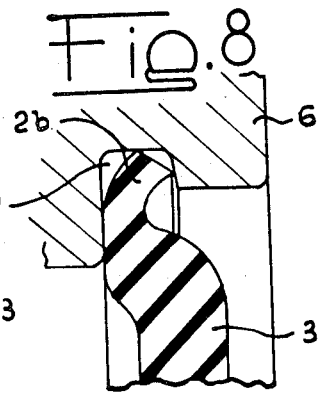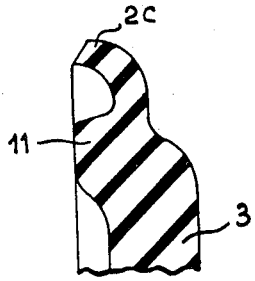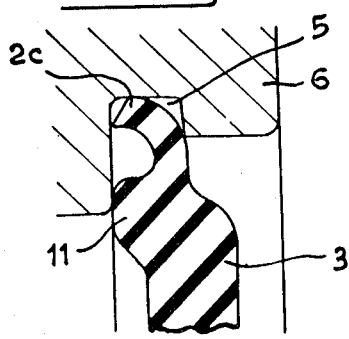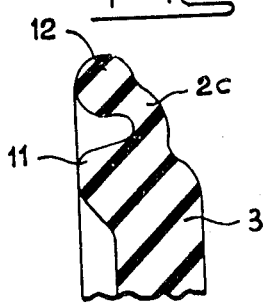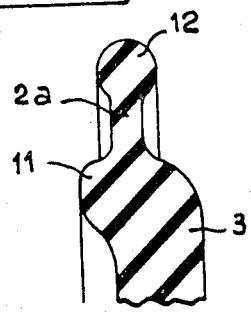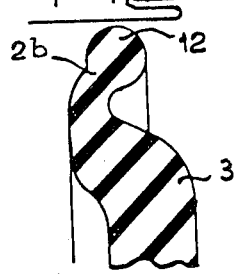

SEALING MEANS FOR BALL OR ROLLER BEARINGS

This application is a continuation of application Ser. No. 461,093, filed Jun. 3, 1965 and now abandoned.

This invention relates to sealing means for ball or roller bearings or the like.

It is known that the useful life and satisfactory operation of ball and roller bearings and relatively moving parts are largely dependent on efficient lubrication and safe protection against access of foreign bodies or moisture between the working surfaces.

It is already known to provide such bearings with sealing means which are elaborate and expensive and comprise parts made of resilient material reinforced by metallic parts, coupled or firmly bonded thereto.

This invention provides sealing means which are simple and inexpensive in manufacture and convenient in use, are easily fitted to ball and roller bearings in order to maintain an efficient lubrication and prevent access of foreign bodies between the working surfaces. To this end the invention provides a seal for ball or roller bearings comprising an annular washer having a shaped outer edge portion adapted to be inserted upon resilient deformation into a groove formed in the outer race ring of the bearing, and be held in the said groove through resilient reaction due to deformation thereof, the said washer presenting an intermediate portion having a larger cross section than said outer edge portion and an inner edge portion tapering in cross section towards the middle axis of the washer and adapted to abut against a surface performing a relative angular motion with respect to the washer, such as the inner ring race of the bearing, the said portions of the washer being made of one piece from a homogeneous resilient material, such as synthetic resin, natural or synthetic rubber alone or combined with fibers of other materials.

Further characteristic features and advantages will be understood from the detailed appended description referring to the accompanying drawings which are given by way of an example.

FIG. 1 is an axial sectional view of a seal according to this invention;

FIG. 2 is an axial sectional view of the seal mounted on a bearing;

FIG. 3, 4 and 5 are axial sectional part views of further modifications of seals of FIG. 1;

FIG. 6 is an axial sectional view of a seal shown in FIG. 5 fitted to the outer race of a bearing;

FIGS. 7 and 9 are axial sectional part views of seals according to a further modification;

FIGS. 8 and 10 show seals of FIGS. 7 and 9 fitted to outer races of respective bearings;

FIG. 11 is an axial sectional part view of a seal provided with an annular bead;

FIGS. 12 and 13 show two modifications of FIG. 11;

Figure 14:
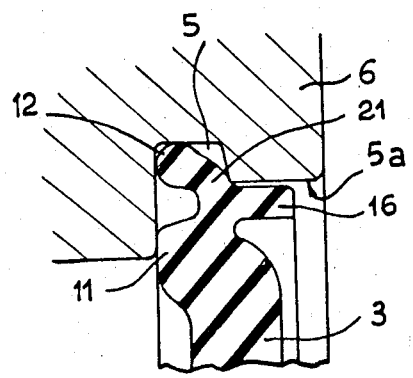
FIG. 14 shows a seal provided with centering studs.

Referring to FIGS. 1 and 2, the seal for ball or roller bearings is generally denoted by reference numeral 1, and comprises a circular washer molded of one piece from resilient and homogeneous material such as synthetic resin, natural or synthetic rubber and the like alone or combined with fibers of other materials without any addition or interposition of reinforcing members, such as springs or washers made of metal or not.

The washer 1 is formed with an outer edge 2 shaped to become engaged upon a resilient deformation by an annular groove 5 formed in the outer race ring 6 of the bearing, coaxially with its rolling track, or in a member fast with said race ring.

The groove, which may be of various shapes, is confined forwardly by a cylindrical bead 5a, the diameter D of which is smaller than the diameter at the groove bottom.

The washer 1 is engaged by the groove 5 by deforming its outer edge 2 to cause it to slip over the bead 5a, and be held in the groove in its deformed condition. On account of the resilient reaction resulting from this deformation, the edge 2 is retained in the groove and adheres to the bearing, as shown in FIG. 2.

The washer further comprises an intermediate rather tough region 3 adapted to withstand within given limits forces due to pressure gradient between the outside and inside of the bearing so as to keep the outer edge of the washer adhering to the groove 5 in the outer bearing race. The stiffness of the intermediate region may be increased, in certain embodiments, by providing outer ribs arranged on either or both faces, of any configuration, whether radial, annular, crossed, etc. FIG. 3 shows an embodiment, in which the intermediate region 3 of the washer is provided on its inner face with two annular ribs 8 and radial ribs 9.

The washer finally comprises an inner edge 4 tapering in cross section towards the rotational axis, adapted to bear by its free end against a surface of a member performing a relative rotational movement with respect to the washer, such as the inner race ring of the bearing. The inner edge 4 can be of various forms. In the embodiment shown in FIG. 1, the edge presents in cross section a single lip, in the embodiment shown in FIG. 4 the edge is formed with two annular lips tapering towards the rotational axis, adapted to act against the rotary surface in order to improve sealing.

The outer edge 2 is shaped in various manners, that is, it can be flat and extend radially, as shown in FIG. 5, in which 2a denotes the portion of the said edge which extends radially about the intermediate region 3 of the washer, the said portion being deformed on assembly to fit in the groove 5 as shown in FIG. 6.

According to the embodiment shown in FIGS. 7 and 9, the outer edge 2b, 2c is curved from one to the other side with respect to the middle plane of the seal; in the assembled condition the edge is outwardly or inwardly curved with respect to the bearing (FIGS. 8, 10).

In the embodiments shown in FIGS. 11, 12 and 13 the outer edge 2 is formed with an annular bead 12 extending circumferentially about the edge. The base of the outer edge 2 can be formed with an annular protuberance 11 which reinforces the connecting zone between outer edge 2 and intermediate region 3 of the seal.

Figure 15:
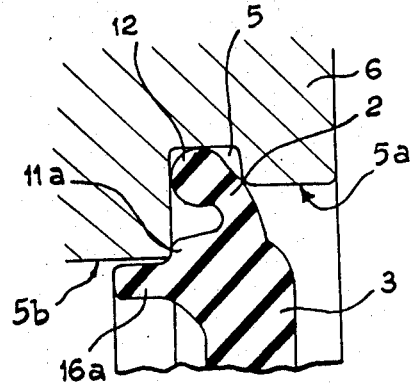
FIG. 15 shows a modification of FIG. 14.

In the embodiment shown in FIGS. 14 and 15 the washer 1 is formed with at least one annular projection 16 axially protruding from the outer or inner or both faces, adapted to center the washer 1 with respect to the groove, by abutting either the outer edge 5a of the groove 5 or its inner edge 5b. In FIG. 15 the centering stud 16a is incorporated by a reinforcing annular protuberance 11a. The said projections are further useful in stiffening the outer edge 2 in order to limit its resilient deformation on assembly.

Figure 16:
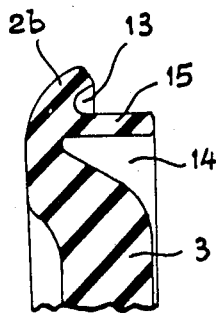
FIGS. 16 and 17 show two further modifications.
Figure 17:
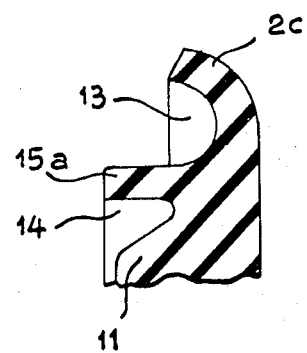

In the embodiments shown in FIGS. 16 and 17 the deformation of the outer edge 2 is improved by the provision of grooves 13, 14 and annular projections 15, 15a arranged at the connecting zone between the outer edge 2 and intermediate portion 3 of the washer.

I claim:

1. A seal for antifriction bearings, the combination comprising; a bearing having an outer race ring with an inner peripheral groove of substantially rectangular cross section located between an axially extending outer cylindrical surface of a diameter less than the diameter of the groove bottom and an axially extending inner cylindrical surface having a diameter less than the diameter of said axially extending outer surface, thereby defining a flat annular radially extending abutment surface facing towards the outside of the bearing and further having an inner race ring with an annular seating of curved cross section, an annular sealing washer made of homogenous resilient material closing the space between the said outer and inner race rings, said sealing washer comprising an intermediate annular flat body portion having a radially extending outer annular edge inserted, with resilient deformation, into said peripheral groove in the outer race ring, and further having a tapered inner lip engaging said annular seating in said inner race ring, said outer edge being formed with an annular bead of circular cross section extending circumferentially about said outer edge in a continuous uninterrupted manner, the circular cross section of the bead being of a diameter such that when said annular bead is inserted in said peripheral groove, there is provided a plurality of spaced apart sealing points between the walls of said groove and the surface of said bead, first and second axially extending annular projections integral with said annular washer and positioned between the outer edge and said intermediate portion, said first and second annular projections being coaxial with said washer and protruding axially from the inner face of the washer, said first annular projection bearing in sealing engagement against said radially extending abutment surface, and said second axially extending annular projection being positioned within and closely adjacent to said axially extending inner cylindrical surface to insure the accurate radial centering of said annular sealing washer in said bearing to thereby seal said bearing.

2. A seal for antifriction bearings, the combination comprising: a bearing having an outer race ring with an inner peripheral groove of substantially rectangular cross section located between an axially extending outer cylindrical surface of a diameter less than the diameter of the groove bottom and an axially extending inner cylindrical surface having a diameter less than the diameter of said axially extending outer surface, thereby defining a flat annular radially extending abutment surface facing towards the outside of the bearing and further having an inner race ring with an annular seating of curved cross cross section, an annular sealing washer made of homogeneous resilient material closing the space between the said outer and inner race rings, said sealing washer comprising an intermediate annular flat body portion having a radially extending outer annular edge inserted, with resilient deformation, into said peripheral groove in the outer race ring, and further having a tapered inner lip engaging said annular seating in said inner race ring, said outer edge being formed with an annular bead of circular cross section extending circumferentially about said outer edge in a continuous uninterrupted manner, the circular cross section of the bead being of a diameter such that when said annular bead is inserted in said peripheral groove, there is provided a plurality of spaced apart sealing points between the walls of said groove and the surface of said bead, first and second axially extending annular projections integral with said annular washer and positioned between the outer edge and the intermediate portion, said first annular projection being coaxial with said washer and protruding axially from the innerface of the washer, said first annular projection bearing in sealing engagement against said radially extending abutment surface, and said second annular projection being coaxial with said washer and protruding axially from the outer face of the washer to a position within and closely adjacent to said axially extending outer cylindrical surface to insure accurate radial centering of said annular sealing washer in said bearing to seal said bearing.